US 7,921,358 B2

(12) United States Patent
Slone et al.

(10) Patent No.: US 7,921,358 B2
(45) Date of Patent: Apr. 5, 2011

(54) AUTOMATIC PACKAGE CONFORMANCE VALIDATION

(75) Inventors: Justin A Slone, Bellevue, WA (US); Mariyan D. Fransazov, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1230 days.

(21) Appl. No.: 11/467,497

(22) Filed: Aug. 25, 2006

(65) Prior Publication Data

US 2007/0168264 A1  Jul. 19, 2007

Related U.S. Application Data

(60) Provisional application No. 60/743,136, filed on Jan. 17, 2006.

(51) Int. Cl.
*G06F 17/00* (2006.01)
*G06F 17/20* (2006.01)
*G06F 17/27* (2006.01)
*G06F 15/16* (2006.01)

(52) U.S. Cl. .................. 715/237; 715/234; 709/232
(58) Field of Classification Search .................. 715/234, 715/237; 709/232
See application file for complete search history.

(56) References Cited

U.S. PATENT DOCUMENTS

| 6,397,259 | B1 * | 5/2002 | Lincke et al. ................. 715/205 |
| 6,763,343 | B1 | 7/2004 | Brooke et al. |
| 7,359,902 | B2 * | 4/2008 | Ornstein et al. ....................... 1/1 |
| 7,370,100 | B1 * | 5/2008 | Gunturu ......................... 709/223 |
| 7,536,681 | B2 * | 5/2009 | Nagendra ..................... 717/136 |
| 7,587,487 | B1 * | 9/2009 | Gunturu ......................... 709/224 |
| 2002/0087571 | A1 | 7/2002 | Stapel et al. |
| 2003/0154444 | A1 | 8/2003 | Tozawa et al. |
| 2003/0163778 | A1 | 8/2003 | Shores et al. |
| 2004/0073870 | A1 | 4/2004 | Fuh et al. |
| 2004/0193627 | A1 | 9/2004 | Matsuda |
| 2004/0205583 | A1 | 10/2004 | Jones et al. |
| 2005/0028084 | A1 * | 2/2005 | Dziejma ......................... 715/505 |
| 2005/0066015 | A1 | 3/2005 | Dandekar et al. |
| 2005/0093770 | A1 * | 5/2005 | de Bonet et al. ................. 345/10 |
| 2005/0114148 | A1 * | 5/2005 | Hinkelman ........................ 705/1 |

(Continued)

FOREIGN PATENT DOCUMENTS

WO    WO0125024    4/2001

OTHER PUBLICATIONS

"UGS and Microsoft to Align Presentation XML Formats to Expand Use of 3-D and Product Life-Cycle Management Information", Sep. 16, 2005, http://www.noticias.info/Archivo/2005/200509/2005/0916/20050916_99166.shtm, pp. 3.*

(Continued)

*Primary Examiner* — Chau Nguyen
(74) *Attorney, Agent, or Firm* — Lee & Hayes, PLLC (57) ABSTRACT

Systems and methods for automatic package conformance validation are described. A package is a logical entity that specifies multiple datastreams for use by an application to render pages and resources associated with one or more documents. In one aspect, the systems and methods automatically validate conformance of the package in view of one or more package and document specifications. The specification(s) identify sets of criteria that delineate structural and markup conformance for the package and fixed payload(s) that specify the document(s), resources, etc. The systems and methods validate package and fixed payload(s), and notify a user of whether the package, documents, and/or associated resources passed or failed respective ones of the conformance criteria,

18 Claims, 6 Drawing Sheets

U.S. PATENT DOCUMENTS

| | | | |
|---|---|---|---|
| 2005/0160108 | A1 | 7/2005 | Charlet et al. |
| 2005/0177543 | A1 | 8/2005 | Chen et al. |
| 2005/0251740 | A1 | 11/2005 | Shur et al. |
| 2005/0262115 | A1 | 11/2005 | Hu et al. |
| 2005/0273701 | A1* | 12/2005 | Emerson et al. ............. 715/513 |
| 2005/0278272 | A1 | 12/2005 | Ornstein et al. |
| 2006/0090195 | A1* | 4/2006 | Pearson et al. .................... 726/3 |
| 2006/0129650 | A1* | 6/2006 | Ho et al. ....................... 709/207 |
| 2007/0121585 | A1* | 5/2007 | Morrissey et al. ............ 370/352 |

OTHER PUBLICATIONS

Dan Richman, "Code war heats up between Microsoft and Adobe", Aug. 8, 2005, http://www.seattlepi.com/business/235686_adobe08.html, pp. 4.*

PCT Search Report for Application No. 2007-00011, mailed on Jun. 22, 2007 pp. 8.

Barbosa, et al., "Efficient Incremental Validation of XML Documents", Available at http://www.cs.toronto.edu/DB/WebPage/files/icde04.pdf, using references dated from 1993-2003.

Eppler, "Universal Data Exchange Protocol based on OPC XML", Available at http://www.fuzzy.fzk.de/eppler/pdf/surikEppler.pdf, using references dated from 1987-2003.

XPS XML Paprer Specification: Overview, Available at http://www.microsoft.com/whdc/xps/default.mspx, 2006.

* cited by examiner

```
Begining Test ******************************************
+Start Test: Automatic Automatic Package Conformance Validation
 +Start Test: Setup
  Pass: Logger Initialized successfully
  Pass: Command line parameters parsed succesfully
  Info: No filename specified for XPS schema. Using default
  Info: No filename specified for Resource Dictionary Key schema. Using default
  Info: No filename specified for Document Structure schema. Using default
  Info: Loading default Schema for XPS Markup.
  Info: Loading default Schema for Resource Dictionary key.
  Info: Loading default Schema for Document structure
 -End Test: Setup Result: Pass
 +Start Test: Processing file:..\ValidBaseDocument.container
  +Start Test: /font_0.TTF validating font
   Info: Name:Times New Roman, Embedding rights:Editable, Glyphs count:15
  -End Test: /font_0.TTF validating font Result: Pass
  +Start Test: /Image_1.JPG validating image
  -End Test: /Image_1.JPG validating image Result: Pass
   ...
```

```
Info: Validating Package structure
Pass: Valid relationship from a PackageRoot part ...
Pass: Found a Valid StartPart with ...
+Start Test: /DocumentSequence_0.fdseq Markup
Info: Validating Markup of Part /DocumentSequence_0.fdseq
  Pass: Markup of Part is Complaint according to the XSD supplied
-End Test: /DocumentSequence_0.fdseq Markup Result: Pass
Pass: Found markup reference to Valid Part with expected ContentType...
+Start Test: /FixedDocument_0.fdoc Markup
Info: Validating Markup of Part /FixedDocument_0.fdoc
  Pass: Markup of Part is Complaint according to the XSD supplied
-End Test: /FixedDocument_0.fdoc Markup Result: Pass
Pass: Found markup reference to Valid Part with expected ContentType...
+Start Test: /FixedPage_1.fpage Markup
Info: Validating Markup of Part /FixedPage_1.fpage...
  Pass: Markup of Part is Complaint according to the XSD supplied
-End Test: /FixedPage_1.fpage Markup Result: Pass
```

```
+Start Test: /FixedPage_1.fpage Relationships
   Info: Validating Relationships of Part /FixedPage_1.fpage
 +Start Test: /font_0.TTF validating font
    Info: Name:Times New Roman, Embedding rights:Editable, ...
 -End Test: /font_0.TTF validating font Result: Pass
   Pass: Found relationship to resource Part: /font_0.TTF
   Pass: Valid relationship from a fixedpage+xml/ part. RelationshipType:
printticket TargetUri: /FixedPagePrintTicket_1.xml
   Pass: Found relationship to resource Part: /image_1.JPG
 -End Test: /FixedPage_1.fpage Relationships Result: Pass
 ...
   Pass: Valid relationship from a fixeddocumentsequence+xml part.
RelationshipType: printticket TargetUri: /DocumentSequencePrintTicket.xml
   Pass: No un-referenced parts found
 End Test: Processing file: .\ValidBaseDocument.container Result: Pass
-End Test:          Result: Pass
*********Log Rollup*************************************
TestName: Automatic Package (Including Package Content) Compliance Validation
PassRate: 100% Pass; 42 Warn; 0 Fail; 0 Block: 0
*****************************************************
Result: Pass
```

AUTOMATIC PACKAGE CONFORMANCE VALIDATION

RELATED APPLICATION

This application claims priority to U.S. provisional patent application Ser. No. 60/743,136, titled "Package Compliance Validation", filed on Jan. 17, 2006, and hereby incorporated by reference.

BACKGROUND

Specifications are typically used to describe a format for a document. For example, the XML Paper Specification (XPS) describes the XPS document format. An XPS document is a paginated representation of electronic paper described in an XML-based format. Documents based on such document specifications are often encapsulated into a container, or package to organize data into files for comprehensive document management. Such packages are typically based on packaging conventions that describe the technique for packaging documents and related information in a file format, describing metadata, parts (e.g., markup and binary resources), relationships between parts, etc. An exemplary such package convention is Open Packaging Specification Convention (OPC). Various applications use such packages to exchange, display, print, package content (e.g., documents, resources, etc.). To produce expected results, these applications rely not only on package conformance to a package specification, but also rely on document conformance to a document specification.

To determine conformance of a package and encapsulated document information, a user typically needs to manually verify that the package and document information conform to the corresponding specifications. However, document and package specifications are generally very large and complex, typically including extensive and detailed descriptions of abstract representations of each object's characteristics and relationship to other objects. As a result, determining conformance of a package and associated document content with corresponding package and document specifications is generally very time consuming, labor intensive, and prone to human error.

SUMMARY

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

Systems and methods for automatic package conformance validation are described. A package is a logical entity that specifies multiple datastreams for use by an application to render pages and resources associated with one or more documents. In one aspect the systems and methods automatically validate conformance of the package in view of one or more package and document specifications. The specification(s) identify sets of criteria that delineate structural and markup conformance for the package and fixed payload(s) that specify the document(s), resources, etc. The systems and methods validate package and fixed payload(s), and notify a user of whether the package, documents, and/or associated resources passed or failed respective ones of the conformance criteria.

BRIEF DESCRIPTION OF THE DRAWINGS

In the figures, the left-most digit of a component reference number identifies the particular Figure in which the component first appears.

DETAILED DESCRIPTION

Overview

Systems and methods for automatic package conformance validation are described. To this end, the systems and methods combine schema definition validation of package markup with a process that analyzes structure of the package to determine whether the package and encapsulated document content is well formed according to corresponding package and document specifications. The structure represents dependencies between respective ones of the package parts/datastreams. The systems and methods provide a user with indications, including verbose error information, of whether the data package (including its encapsulated fixed payload content) complies or does not conform to corresponding ones of the specifications, These and other aspects for automatic package conformance validation are now described in detail.

An Exemplary System

Systems and methods for automatic package conformance validation are described in the general context of computer-executable instructions program modules being executed by a computing device such as a personal computer. Program modules generally include routines, programs, objects, components, data structures, etc., that perform particular tasks or implement particular abstract data types. While the systems and methods are described in the foregoing context, acts and operations described hereinafter may also be implemented in hardware.

Figure 1:
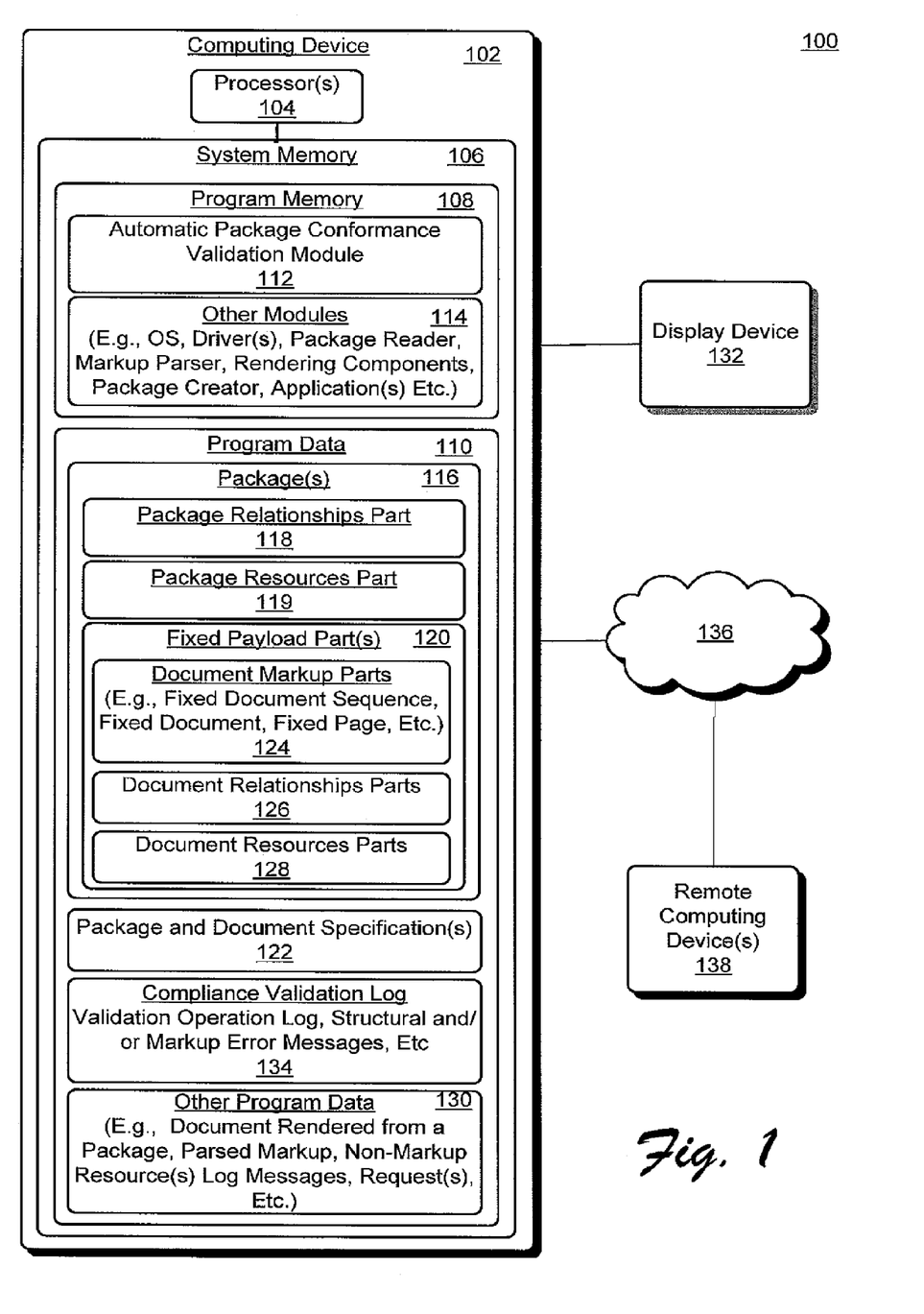
FIG. 1 shows an exemplary system for automatic package conformance validation, according to one embodiment.

FIG. 1 shows an exemplary system 100 for automatic package conformance validation according to one embodiment. System 100 includes a computing device 102. The computing device 102 includes one or more processors 104 coupled to system memory 106. System memory 106 includes one or mote of RAM, ROM, EPROM, NVRAM, EEPROM or any kind of storage device capable of holding the module instructions and data. System memory 106 includes computer executable instructions in the form of computer-program modules in program memory 108, and data in program data 110. In this implementation, for example, program memory 108 includes package conformance-validation module 112 ("validation module 112") and other program modules 114 such as an operating system, device drivers, a package reader, a markup language parser, an application to utilize/render a data package validated for conformance by validation module 112, and/or so on.

Validation module 112 validates conformance of a package 116 (hereinafter often called a "data package"), including encapsulated package relationships parts 118 (a logical entity identifying other datastreams) and fixed payload parts 120 to respective ones of package and document specifications 122. A fixed payload part 120 is a logical entity encapsulating other datastreams that specify document content, resources, etc. Package(s) 116 may be stored in compressed or uncompressed formats. In this implementation, package and document specifications 122 are respectively based on OPC and XPS. In a different implementation, different package and document specifications 122 are utilized.

As shown in FIG. 1, package 116 includes, for example, a package relationships part 118 (respective package parts) and fixed payload part(s) 120. A fixed payload part 120 includes, for example, the following package parts: document markup parts 124, document relationships parts 126, and document resources parts 128. In one implementation, and for purposes of exemplary description, markup language (or "markup") used in a package 116 and fixed payload part 120 is XML, although other markup languages could be used. Each of the respective package parts 118 and 124 through 128 represents a respective set of datastreams for use by an application (e.g., a respective application of "other program modules" 114) to render documents and resources specified by a package 116. In this implementation, each respective package part is associated with a name and a content type (MINE). Like Universal Resource Identifiers (URIs), part names are hierarchically divided into segments, e.g. /markup/mypart.xml. Content types of parts are defined in a specially named XML stream. The URI scheme is used to address respective package parts. In this implementation, an exemplary such address is composed of a specially-escaped container URI plus the part name, although other addressing schemes could be used. For example, pack://http:,,www.microsoft.com,mypackage.container/mypart.xml URI refers to a part /mypart.xml within a container http://www.microsoft.com/mypackage.container.

Relationships parts (e.g., please refer to package parts 118 and 126) explicitly identify relationships between parts (i.e., data streams), and therefore, respective structure of package 116 and fixed payload part 120. A relationship part is attached to another part via a naming convention. An exemplary such naming convention is shown in the following example: /markup/_rels/mypart.xml.rels is the relationships part for /markup/mypart.xml, although other naming conventions could be used. A relationship may be associated with a package 116 as a whole. Additionally, parts may internally reference other parts without defining a relationship.

Figure 2:
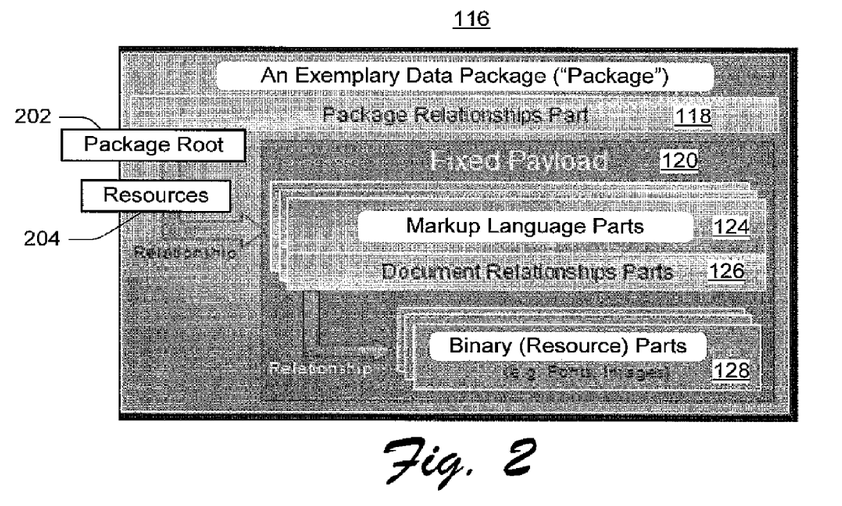
FIG. 2 shows an exemplary block diagram of a package, according to one embodiment.

FIG. 2 shows an exemplary block diagram of a package 116, according to one embodiment. Respective components 116 through 128 of package 116, as shown in FIG. 2, correspond to the respective components and relationships of package 116 of FIG. 1, described above.

TABLE 1, which is shown immediately below, shows an exemplary package parts relationship declaration, according to one embodiment. In this example, "Target" represents a URI of a referenced part. "ID" uniquely identifies the relationship within the particular relationships part. Type specifies a namespace-like definition of the purpose of the relationship

TABLE 1

EXEMPLARY RELATIONSHIP DECLARATION

<Relationships
xmlns="http://schemas.microsoft.com/metro/2005/02/relationships">

TABLE 1-continued

EXEMPLARY RELATIONSHIP DECLARATION

<Relationship
Target="../tickets/ticket1.xml"
ID="A5FFC797514BC"
Type="http://schemas.microsoft.com/metro/2005/02/rp/printticket"/>
</Relationships>

Figure 3:
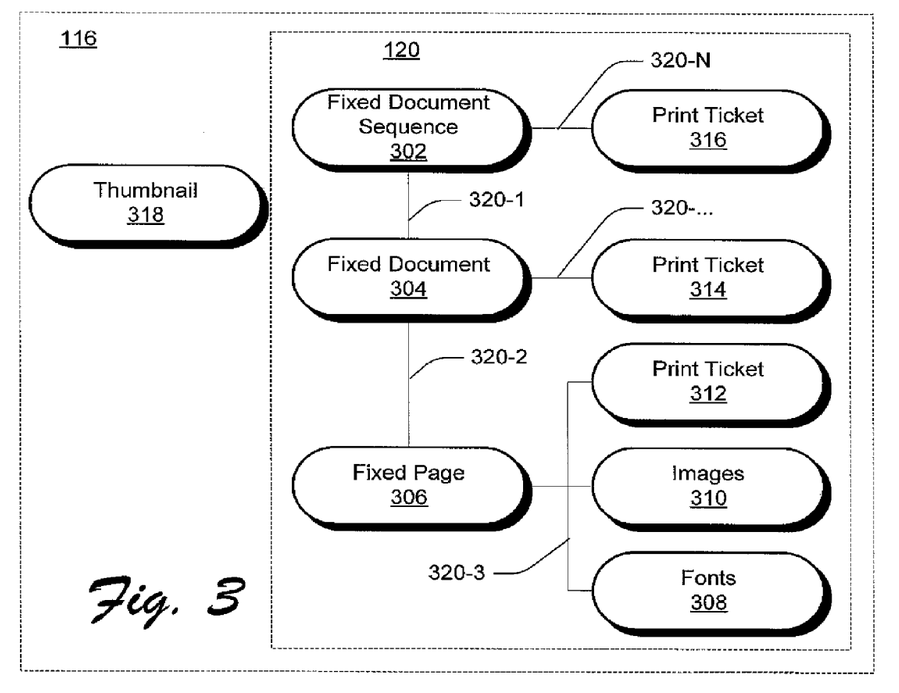
FIG. 3 shows an exemplary hierarchical set of fixed payload specified document parts used to describe various aspects of document content, according to one embodiment.

FIG. 3 shows an exemplary hierarchical set of fixed payload specified document markup parts 124, relationship parts 126, and resource parts 128 used to describe various aspects of document content, according to one embodiment. In this implementation, the hierarchical set of document parts is based on XPS, and reflects a fixed document 304 spooling to a printer. In a different implementation, the various parts of fixed payload 120 are based on a different document specification. In another implementation, the parts of fixed payload describe a document independent of printer spooling aspects. In this implementation, document content is described, for example, with the following document markup parts 124 (FIG. 1): a fixed document sequence part 302, a fixed document part 304, and a fixed page part 306. At the top of the component hierarchy fixed document sequence object 302 which is a root of an entire fixed payload 120 (FIG. 1), and may roll up one or more fixed documents 304. As shown, fixed document sequence object 302 includes references to fixed document object(s) 304 in a package 116.

Each fixed document object 304 represents individual documents, chapters, or other document-defined groups of pages (represented by respective fixed page(s) 306) in the package 116. That is, each fixed document object 304 contains references to one or more fixed page objects 306. A fixed page object 306 includes zero or more document resource parts 128 (e.g., fonts 308, images 310 etc.). In this example, a fixed page object 306 includes, for example, markup describing the page, references to fonts 308, images 310, etc. (e.g., annotation(s), custom resources, etc.). Each of document markup part 124 (e.g., parts 302 through 316) is connected to a different respective part 124 via a relationship 320 (e.g., 320-1 through 320-N) specified in document relationships parts 126 of FIG. 1.

In the example of FIG. 3, fixed payload 120 specifies, for example, the following parts (datastreams) for use by an application to render document 300.

FixedDocumentSequence—Root (a logical entity identifying other datastreams) of the document (block 302 of FIG. 3)

FixedDocument—Document XML markup (a logical entity identifying other datastreams) (block 304 of FIG. 3)

FixedPage—Page XML markup (a logical entity identifying other datastreams) (block 306)

Font—Embedded font (block 308)

Image—Embedded image (block 310)

Thumbnail—Page thumbnail images

PrintTicket—Printer settings for page/document (blocks 312 through 316)

Exemplary fixed payload relationships (i.e., document relationships parts 126 of FIG. 1) include, for example, relationships identifying:

FixedRepresentation—Points to a document root (fixedDocumentSequence)

RequiredResource—Identifies any image image, font, ICC profile, or remote resource dictionary needed to render a page PrintTicket—In this example, printer settings In the example of FIG. 3, package 116 and fixed payload 120 are organized in a logical hierarchy reflected in the naming convention presented in FIG. 3. It can be appreciated that for different documents (e.g., document not directed for print spooling), different naming conventions can be used. In this implementation, and in addition to the hierarchy of document parts, package 116 optionally contains a thumbnail image (e.g., thumbnail image 318) that an operating system and applications can use as a visually summarized representation of the document 300. This resource is identified by a corresponding relationship identified in package relationships part 118 of FIG. 1.

TABLE 2 shows an exemplary XML sequence for a fixed document sequence part 302 of FIG. 3, according to embodiment.

TABLE 2

```
<FixedDocumentSequence
    xmlns="http://schemas.microsoft.com/metro/2005/02/rp">
    <DocumentReference Source="/doc1/FixedDoc1.xml"/>
    <DocumentReference Source="/doc2/FixedDoc2.xml"/>
</FixedDocumentSequence>
```

TABLE 3 shows an exemplary XML sequence for a fixed document ("FixedDocument") part 306 of FIG. 3, according to an embodiment. Each FixedDocument part 306 is the root of an individual set of one or more fixed page ("FixedPage") parts 310, which include all markup used to render a single page.

TABLE 3

```
<FixedDocument
    xmlns="http://schemas.microsoft.com/metro/2005/02/rp">
    <PageContent Source="/doc1/FixedPage1.xml"/>
    <PageContent Source="/doc1/FixedPage2.xml"/>
</FixedDocument>
```

Exemplary Conformance Checking

Validation module 112 validates structural and markup conformance of package 116 and package content (e.g., fixed payload(s) 120) in parallel by identifying package parts 118 through 128 and following relationships and in-line markup references specified in respective ones of the package parts. Package specification 122 includes text that defines structural and markup conformance of package 122. Document specification 122 includes text that defines structural and markup conformance of fixed payload(s) 120. Validation module 112 reads package 116 to identify/discover package parts, one-by-one, and build structure of the package 116 by processing package part specified relationship data, markup references, and implicit references. In this implementation, validation module 112 determines datastream conformance upon discovering the datastream. In another implementation, validation module 112 determines datastream conformance at any time after discovering the datastream, rather than immediately validating conformance of the datastream upon discovery (e.g., after discovering subsequent datastreams). In one implementation, a well-formed package 116 includes package relationship parts 118, one or more fixed payload parts 120, and for each fixed payload part 120, corresponding document markup parts 124, document relationships parts 126, and document resources parts 128. In a different implementation, a well-formed package 116 may include a different set of package parts. In one implementation, validation module 112 reads package 116 using known packaging APIs such as Windows Presentation Foundation packaging APIs.

To validate package and package content conformance, validating module 112 visits all parts in the package 116 and fixed payload(s) 120. For each package part identified, validation module 112 retrieves the datastream (package part) and validates content of the part based on the content type. Content types include, for example markup content and non-markup (e.g., binary) content. Markup data includes package markup, relationship markup, and fixed payload markup. Non-markup includes package 116 resources (thumbnails, digital certificates, etc.) and fixed payload 120 resources (fonts, images, digital certificates, remote resource dictionaries, etc.). When a portion of content encapsulated by a package 116 does not meet a requirement identified in a corresponding specification 122, validation module 122 (or another module employed by validation module) logs a corresponding error message in a log file (e.g., conformance validation log 134).

Referring to FIGS. 1 through 3, to validate conformance of a package 116 in view of a package specification 122, for example, validation module 112 validates package relationship markup parts 118 and package resource parts 119, processes identified package relationships to determine structure of package 116, and validates identified non-markup resources such as digital signatures, or properties, thumbnails, etc. In another example, to validate a fixed payload 120 in view of a document specification 122, validation module 112 begins conformance validation operations from an identified fixed representation relationship that identifies a fixed payload 120. In this implementation, package relationship parts 118 specify the fixed representation relationship. Fixed payload 120 includes fixed document sequence 302 (i.e., a "FixedDocumentSequence" tag element or equivalents thereof). At this point, validation module 112 validates markup of the fixed document sequence 304, and follows one or more document references (e.g., "<DocumentReference>") to one or more respective fixed document(s) 304 (a fixed document 304 is also represented in this description with a "FixedDocument" element).

Validation module 112, for each identified fixed document 304, validates the markup of the fixed document 304, and then and follows each of one or more page content references (e.g., identified with a "<PageContent>" markup tag) to validate markup of each fixed page 306. For each fixed page 306, validation module 112 discovers any associated resource parts 128 such as fonts 308 and/or images 310 and performs resource validation operations. That is, when there is more than one document reference element ("<DocumentReference>") in fixed document sequence markup, validation model 112 validates an entire fixed document 304 and all of its associated fixed pages 306 (including any resources associated with each fixed page 306), before continuing to validate a second document reference (i.e., fixed document 304), etc.

For each resource (e.g., fonts, images, ICC profiles, remote resource dictionaries, etc.) associated with a fixed page 306, validation module 112 performs specific validation for the resource. For example, when determining conformance of a font, validation module 112 determines, for example, whether the font is a non-embeddable font. In another example, when determining conformance of an image, validation module 112 determines whether content type of an image is incorrect content type. In yet another example, when determining conformance of a remote resource dictionary, the remote resource dictionary is validated for conformance similar to a fixed page 306 in that the markup of the remote resource dictionary and each of the parts specified in the remote resource dictionary parts are processed and validated.

Subsequent to verifying conformance for a particular resource, validation module 112 determines, for every markup referenced resource part, that there is a corresponding required-resource relationship. A common source of non-conformant documents are those that (in the FixedPage markup) reference a resource (font, image, etc.) and do not specify a required-resource relationship to this resource. Without the required-resource, relationship consumers are unable to determine what resources are required to render a FixedPage unless they parse the FixedPage markup, which is not a trivial task for non-rendering consumers. TABLE 4 shows an exemplary markup specifying a required-resource relationship, according to one embodiment.

TABLE 4

EXEMPLARY MARKUP SHOWING REQUIRED-RESOURCE RELATIONSHIP

<Relationships
xmlns="http://schemas.openxmlformats.org/package/2006/relationships">
  <Relationship Type="http://schemas.microsoft.com/xps/2005/06/required-resource" Target="../../../Resources/Fonts/arial.ttf" Id="Rfont" />

In one implementation, during package and package content conformance validation processes, validation module 112 maintains a log (conformance validation log 134) of the validating operations and corresponding results. In one implementation, the log identifies at least a subset of the operations performed and indications of whether respective ones of the conformance validation operations passed or failed. In one implementation, validation module 112 operates in verbose mode, presenting operational messages, including error messages to a user, for example, on a display device 132, via audio, etc. In another implementation, validation model 112 identifies any package parts that were not validated during conformance validation operations. Such parts may represent one or more documented or non-documented extensions to a respective specification 122. For example, if the package 1 16 includes package parts that are not in a fixed payload 120, validation module 120 will provide a corresponding message to a user.

We now describe specific operations to validate package parts that include markup content and package parts that include non-markup content.

Markup Content

Validation module 112 determines conformance of package parts that include markup (e.g., package markup, relationship markup, fixed payload and document markup, etc.) by validating the markup prior to parsing (rendering) the markup. Validation module 112 validates markup conformance in view of one or more corresponding schema definitions that formally describe elements in the markup. Validation module 112 identifies the particular schema definition to validate conformance of specific markup based on the particular content type of part associated with the markup. For example, if markup is contained in fixed payload 120, a corresponding document specification 122 provides schema definitions for associated markup. In another example, if markup is contained in package 116 and not encapsulated in fixed payload 120, a corresponding package specification 122 provides the schema definitions for the associated markup. In one implementation, the markup is XML and the schema definitions are XML schema definitions (XSDs).

Non-Markup Content

Validation module 112 validates conformance of identified non-markup data based on content type (e.g., font image, digital certificate, etc.). Package specification 122 includes definitions for non-markup references such as thumbnails (images), digital signatures, package properties (metadata), etc. In one implementation, validating module 112 uses WPF APIs to validate and images by determining whether the image can be successfully decoded. In another example, validating module 112 validates conformance of a font resource in view of identified incoming inline markup reference(s)—reference(s) specified in the markup of the FixedPage part contained in 124. When processing a font resource, first the font is decoded using, for example, known WPF APIs, then licensing intent of the font is inspected to ensure that the font has been embedded in the document in accordance with any and all licensing intents (e.g., licensing intents requiring a font to be embedded a certain way, a font not be embedded at all, etc.).

Exemplary Conformance Validation Logs, Command Line Parameters Etc.

Figure 4:
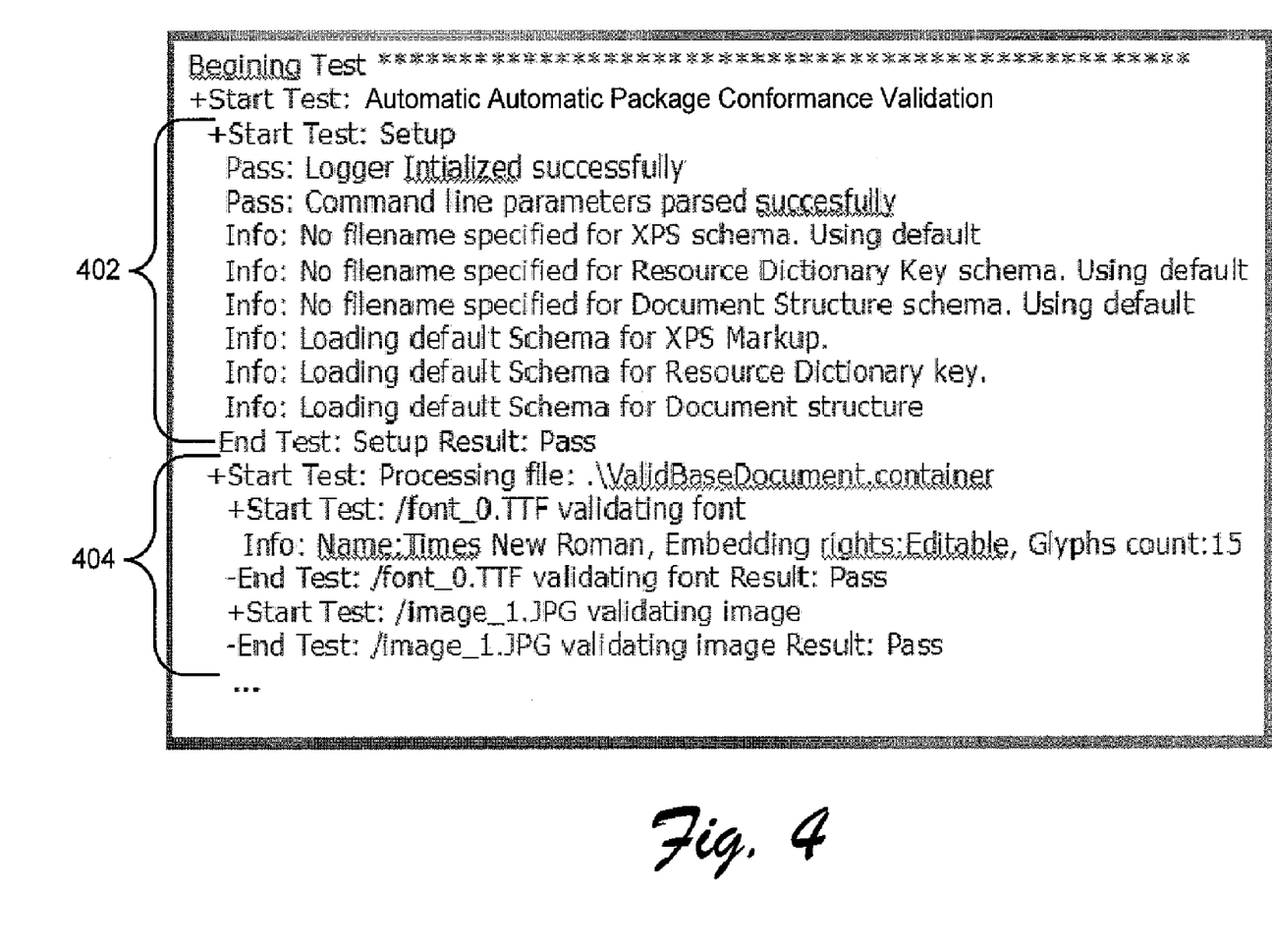
FIG. 4 shows aspects of an exemplary conformance validation log, according to one embodiment.
Figure 5:
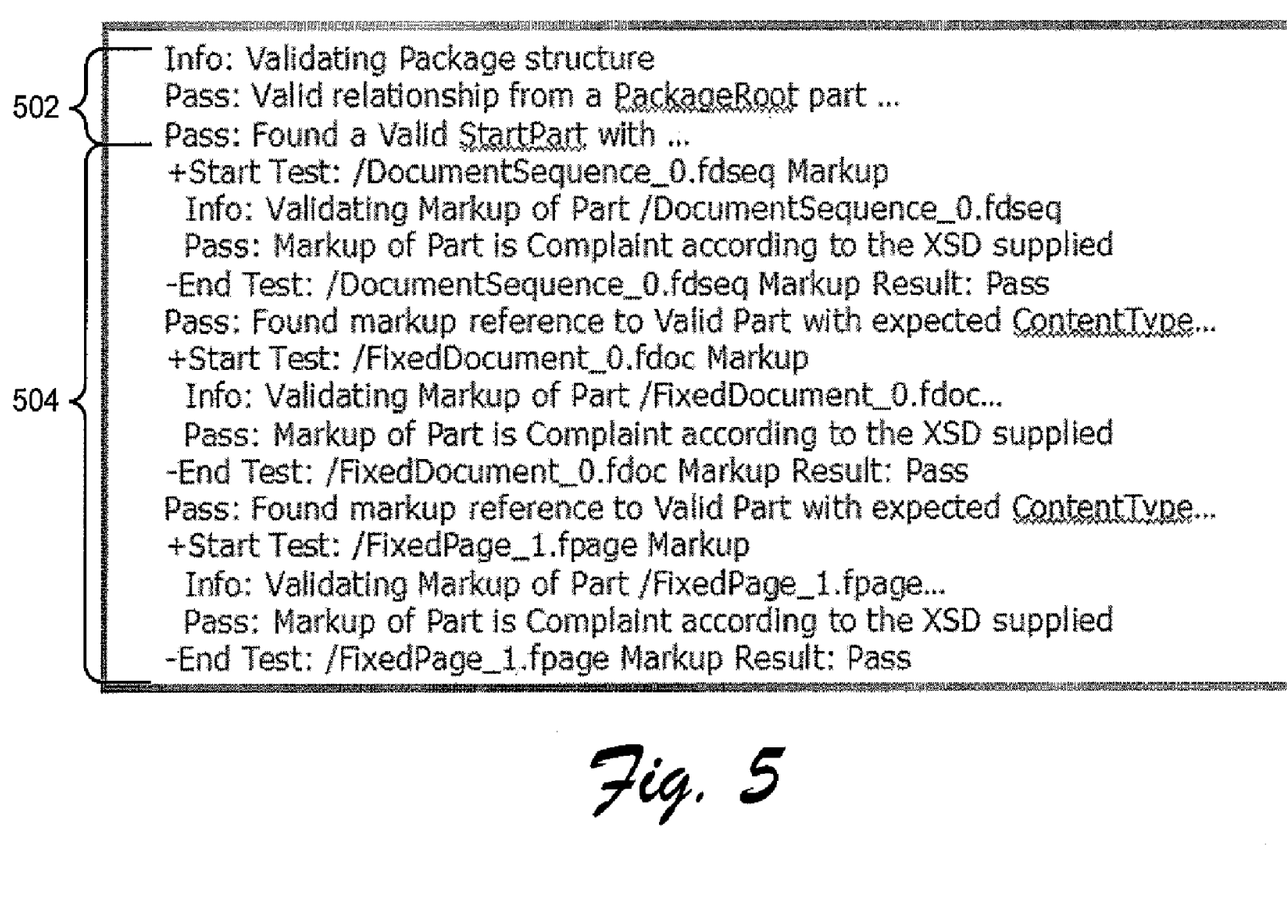
FIG. 5 shows further aspects of an exemplary conformance validation log, according to one embodiment.
Figure 6:
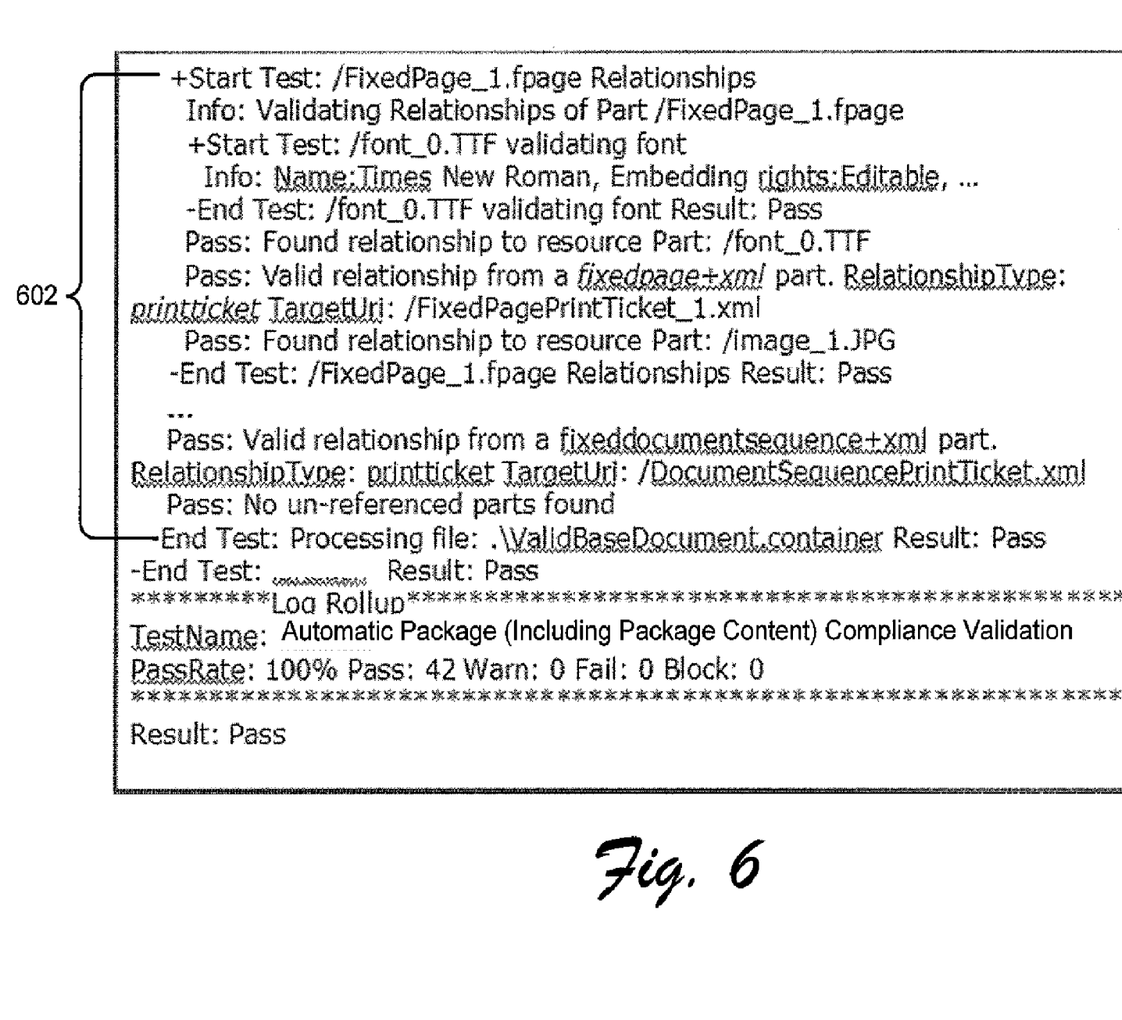
FIG. 6 shows further aspects of an exemplary conformance validation log, according to one embodiment.

FIGS. 4 through 6 show respective aspects of an exemplary conformance validation log, according to one embodiment. Such a conformance validation log is also shown as "conformance validation log 134" of FIG. 1 Referring to FIG. 4, section 402 shows log activity during validation module 112 set-up/initialization operations, according to one embodiment. In this implementation, validation module 112 implements set-up/initialization operations by processing any command line parameters, and searching for and loading package and document specifications 122 (shown in FIG. 4 as "schemas"). In this example, no specific package and/or document schemas were specified by a user (e.g., via command line parameters). In this example, validation module 112 loads default package and/or document specifications 122 (schemas).

TABLE 5 shows an exemplary set of command line parameters, according to embodiment.

TABLE 5

EXEMPLARY PACKAGE CONFORMANCE VALIDATION PARAMETERS

-f=<FilePat> : The file to perform the validation on.
/s        : Apply pattern to all subdirectories
-logger:<LoggerType>
    : The logger to use (E.g., File, Console, Windows Test Technologies (WTT), etc.).
    The default logger is "console".
-logfile:<LogFile>
    : The log file to write to when using the File logger.
    The default log file is "isXPSLog.txt".
/?    : Display this help

TABLE 5-continued

EXEMPLARY PACKAGE CONFORMANCE VALIDATION PARAMETERS

```
Xsd Switches (optional for custom XSDs):
  -x:<S0Xsd>   : The path to the S0 xsd
  -r:<RSCXsd>  : The path to the Resource dictionary key xsd
  -doc:<DOCXsd> : The path to the Document Structure xsd
Advanced Switches:
  -logprefix:<Prefix>
    : specifies the prefix to append to log files from this run.
      Setting this will enable log file splitting output (for large runs)
      With log file splitting (File logger only), the setup will be output
      to the specified log file while the actual test results will be stored
      in the log file "prefix__#to#.log files"
  -logsplit:<Number>
    : How often should isXPS split the log file (Default: 0)
      Setting this will enable log file splitting output (for large runs)
  -BadDir=<Quarantine path>  : Copy invalid packages to this directory.
  /DelBad           : Delete invalid packages.
  /OnlyOPC          : Only validate against the OPC specification.
  /OnlyPkg          : Only validate the package structure.
  /SkipResParts     : Don't validate resource parts content. Assumed if OnlyPkg.
  /NoInterleave     : Turn off interleaving validation.
  -device:<DeviceString>
    : The device string to use with a logger (e.g., a known WTT logger).
    : the default device is "$LogFile:file=isXPSLog.wtl,WriteMode=append".
```

Referring to fig a 4, section 404 shows the set of operations used to validate conformance of non-markup resources associated with package 116 in view of the package specification 122.

FIG. 5 shows further aspects of the exemplary conformance validation log of FIG. 4, according to one embodiment. Section 502 of FIG. 5 shows exemplary log file output responsive to package structure validation. To generate this output, validating module 112 validates package structure by first validating relationship markup (prior to parsing relationship markup) specified in package relationships part 118. Section 504 of FIG. 5 shows exemplary log file output responsive to validation module 112 to validate markup conformance of a fixed document sequence 302, a fixed document 304, and a fixed page 306.

FIG. 6 shows further aspects of the exemplary conformance validation log of FIGS. 4 and 5, according to one embodiment. As shown in FIG. 6, section 602, validating module 112 has generated log output corresponding to conformance validation of fixed page relationships, and non-markup resources.

An Exemplary Procedure

Figure 7:
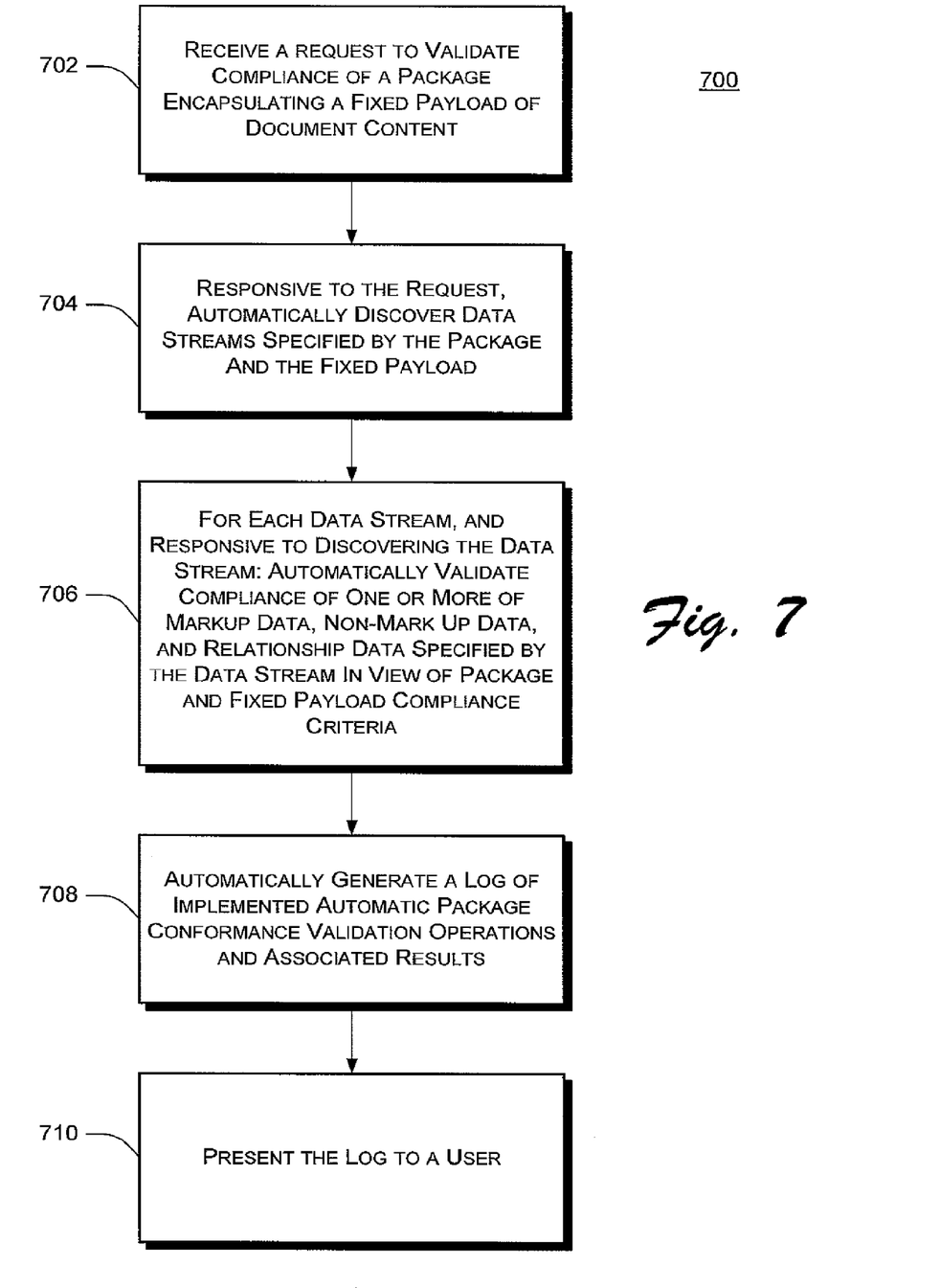
FIG. 7 shows an exemplary procedure for automatic package conformance validation, according to one embodiment.

FIG. 7 shows an exemplary automatic package-conformance validation procedure 700, according to an embodiment. For the purposes of exemplary illustration and description, the operations of procedure 700 are described with respect to aspects of one or more of FIGS. 1 through 6. Referring to FIG. 7, operations of block 702 receive a request to validate conformance of a package 116 encapsulating a fixed payload 120 of document content. In one implementation, package conformance-validation module 112 receives a request from a user of computing device 102 or remote computing device 138 to validate conformance of the package 116. In one implementation, the request includes a number of command line parameters specifying one or more of input/output and operational criteria of the automatic package-conformance validation operations. For purposes of exemplary illustration, such a request is shown as a respective portion of "other program data" 130 of FIG. 1.

Operations of block 704, response to receiving the request, automatically discover datastreams specified by the package 116. Referring to FIG. 1, such datastreams are represented by package parts such as package relationships part 118, fixed payload parts 120, document markup parts 124, document relationships parts 126, and/or document resources parts 128. These package parts represent datastreams and may specify one or more additional datastreams. In one implementation, the discovered datastreams include datastreams of the fixed payload 120. In one implementation, command-line parameters provided with the request, direct operations of block 704 to discover and validate only package 116 against package specification 122, independent of fixed payload 120 and/or resource validation operations. In one implementation, package conformance-validation module 112, responsive to receiving the request, automatically discovers datastreams associated with the package 116. Depending on the particular implementation of package conformance module 112, default values, and/or received command-line parameters, these datastream discovery operations may also include discovering datastreams of one or more fixed payloads 120 encapsulated by package 116.

Operations of block 706, for each discovered datastream, and responsive to discovering the datastream, automatically validates conformance of one or more of the datastreams (e.g., markup data, non-markup of data (e.g., binary resources), and/or relationship data) in view of package and/or fixed payload conformance criteria. In one implementation, conformance validation module 112 validates conformance of each datastream as the datastream is discovered/identified. The particular conformance criteria applied to determine conformance of a particular datastream is based on the datastream's particular content type. For example, datastreams associated with the fixed payload 120 are validated in view of the document or paper specification 122 (FIG. 1). In another example, datastreams associated with the package 116 that encapsulate one or more fixed payload's 120 are validated for conformance in view of a package specification 122. In one implementation, markup datastreams are validated for conformance in view of schema definitions and/or local and/or remote resource dictionaries specifying proper format and/or content of the markup datastreams. In yet another example, font resources are validated for conformance in view of one or more incoming relationships specified by a relationships package part (e.g., please see package relationships-part 118 or document relationships parts 126).

Operations of block 708 automatically generate a log of the implemented package conformance-validation operations and associated results. In one implementation, package conformance-validation module 112 automatically generates the log (shown as conformance validation log 134 in FIG. 1) as the module 112 implements respective ones of the conformance validation operations and receives/determines correspondent results. Operations of block 710 present the log to a user. Such presentation can be in many different forms. For example, in one implementation, validation model 112 (or other module 114) implements one or more of the following: displaying the log on a display device 132, printing the log on a print device, providing the user with one or more audio indications of log contents, communicating the log to a requesting remote computer device 138 for presentation to the user, etc.

Alternate Embodiments

Although systems and methods for automatic package conformance validation have been described in language specific to structural features and/or methodological operations or actions, it is understood that the described implementations are not necessarily limited to the specific features or actions described and do not limit the scope of the appended claims.

For example, in one implementation, computer 102 is coupled across a network 136 to one or more remote computing devices 138. In such a scenario, and in one implementation, one or more of the operations described above with respect to computer 102 implementing conformance validation of a package 116 are distributed to a remote computing device 138 for implementation. In another exemplary alternative embodiment, computing device 102 implements a service that provides automatic (programmatic) package conformance verification services to one or more such remote computing devices 138. In this latter scenario, a remote computing device 138 requests computing device 102 verify conformance of a specific package 116 in view of one or more identified specifications 122.

Accordingly, the specific features and operations of automatic package conformance validation described above with respect to FIGS. 1 through 7 are disclosed as exemplary forms of implementing the claimed subject matter.

The invention claimed is:

1. A method at least partially implemented by a computer, the method comprising:
 automatically validating conformance of a package and one or more fixed payloads encapsulated by the package, each fixed payload comprising a set of package parts identifying datastreams for use by an application to render a document specified by the fixed payload, a package specification identifying a first set of conformance criteria for the package, and a document specification specifying a second set of conformance criteria for the one or more fixed payloads, wherein the first set of conformance criteria in the package specification defines structural and markup conformance of the package and the second set of conformance criteria in the document specification defines structural and markup conformance of the one or more fixed payloads,
 wherein automatically validating conformance further comprises:
  reading the set of package part datastreams;
  for each datastream of the set of package part datastreams, responsive to reading the datastream, determining whether the datastream represents a markup;
  verifying conformance of the markup with a markup schema definition, wherein the markup schema definition is specified by the package specification when the markup is independent of the one or more fixed payload parts and the markup schema definition is specified by the document specification when the markup is part of the one or more fixed payload parts; and
  identifying markup content from parsed markup;
  if the markup content specifies a relationship, verifying conformance of at least one dependency between package or document parts, the at least one dependency being indicated by the relationship; and
  if the markup content does not specify a relationship, determining conformance of the markup content based on markup content type; and
 presenting an indication to a user of whether the package and the one or more fixed payloads conform with respective ones of the first and second conformance criteria.

2. The method of claim 1, wherein the package specification is based on Open Packaging Specification Convention.

3. The method of claim 1, wherein the document specification is an Extensible Markup Language Paper Specification.

4. The method of claim 1, wherein the indication further comprises an ordered list of package and fixed payload parts that were evaluated for conformance.

5. The method of claim 1, wherein the indication further comprises a list of any package or fixed payload parts present but not evaluated for conformance.

6. The method of claim 1, wherein automatically validating conformance further comprises:
 validating conformance of package and fixed payload markup;
 validating conformance of package and fixed payload structure; and
 validating conformance of any package and fixed payload non-markup resources.

7. The method of claim 1, wherein the markup content type comprises a fixed document sequence, a fixed document, a fixed page, or a binary resource.

8. The method of claim 1, wherein the automatically validating conformance further comprises:
 determining whether the datastream represents a binary resource; and
 if the datastream represents the binary resource and the binary resource is a font, verifying conformance of the binary resource further comprises verifying conformance of the binary resource based on incoming relationships.

9. The method of claim 1, wherein the content type is a fixed document of one or more fixed documents specified by a payload of the one or more fixed payloads, and wherein determining conformance further comprises:
 for each fixed document of the one or more fixed documents:
  verifying conformance of the fixed document and datastream(s) referenced by the fixed document prior to verifying conformance of any next unverified fixed document of the one or more fixed documents, a datastream of the datastream(s) referenced by the fixed document being a fixed page, conformance verification of the fixed page being such that conformance of the fixed page and any binary resource referenced by the fixed page is completed prior to verifying any next fixed page referenced by the fixed document.

10. A computer-readable storage medium comprising computer-program instructions executable by a processor to implement operations for:
 discovering datastreams specified by a package comprising one or more fixed payloads:

for each datastream of the datastreams, and responsive to discovering the datastream:
(a) validating conformance of data specified by the datastream, wherein the data comprises markup; and
(b) validating conformance of the data in view of one or more specifications providing conformance criteria for the package and the one or more fixed payloads, each fixed payload specifying data for an application to render a document specified by the fixed payload, wherein the conformance criteria for the package define structural and markup conformance of the package and the conformance criteria for the one or more fixed payloads define structural and markup conformance of the one or more fixed payloads, the validating conformance comprising:
determining whether the markup complies with a markup schema definition, the markup schema definition specified by the package specification when the markup is independent of the one or more fixed payload part and the markup schema definition is specified by the document specification when the markup is part of the one or more fixed payload parts;
identifying markup content from parsed markup;
if the markup content specifies a relationship, verifying conformance of at least one dependency between package or document parts, the at least one dependency being indicated by the relationship; and
if the markup content does not specify a relationship, determining conformance of the markup content based on markup content type; and
generating a log of implemented package conformance validation operations and associated results for presentation to a user.

11. The computer-readable storage medium of claim 10, wherein a datastream of the datastreams is external to the package.

12. The computer-readable storage medium of claim 10, wherein Open Packaging Specification Conventions and Extensible Markup Language Paper Specification specify at least a subset of the conformance criteria.

13. The computer-readable storage medium of claim 10, wherein generating the log further comprises identifying any discovered datastream that was not validated for conformance.

14. The computer-readable storage medium of claim 10, wherein
if the markup complies with the schema description:
parsing the markup to identify content associated with the markup; and
validating conformance of the content based on content type; and
if the markup does not conform with the schema description:
not parsing the markup; and
logging a corresponding error message in the log.

15. The computer-readable storage medium of claim 14, wherein the content type is one of a relationship specifying a dependency between package parts or fixed payload parts, a binary resource part, a fixed document part, or a fixed page part.

16. The computer-readable storage medium of claim 10, wherein computer-program instructions further comprise instructions for:
receiving a request from a remote computing device, the request directing a service provided by the computer-program instructions to verify conformance of the package according to the one or more specification or default specifications; and
responsive to receiving the request, discovering the datastreams, validating conformance of the datastreams, and communicating the log to the remote computing device.

17. The computer-readable storage medium of claim 10, wherein computer-program instructions further comprise instructions for:
determining conformance verification parameters, the conformance verification parameters providing one or more of: an identity of the package, an indication of an application to generate the log, a path to an application to parse markup, a name for the log, a path to a package specification, a path to a document specification, a path to a resource dictionary, an indication to delete the package if the package is determined not to be in conformance, an indication to validate only the package and not validate the one or more fixed payloads, an indication to validate only structure of the package, and an indication to not validate binary resource(s).

18. A computing device comprising:
a processor; and
a memory coupled to the processor, the memory comprising computer-program instructions that when executed by the processor implement operations for:
providing a networked service to a requesting computing device coupled the computing device, the networked service for:
receiving a request from the requesting computing device;
responsive to receiving the request:
verifying conformance of multiple datastreams discovered in a package, the conformance of each respective datastream of the multiple datastreams being evaluated based on content type of the respective datastream in view of one or more package specification and document specification the package for use by an application to render one or more documents specified by respective ones of the datastreams, the package specification defining structural and markup conformance of the package, the document specification defining structural and markup conformance of one or more fixed payload parts in the package, the verifying comprising:
reading package part datastreams;
for each datastream of the package part datastreams, determining that the datastream respresents markup;
verifying conformance of the markup with a markup schema definition,
wherein the markup schema definition is specified by the package specification when the markup is independent of the one or more fixed payload parts,
wherein the markup schema definition is specified by the document specification when the markup is part of the one or more fixed payload parts; and
responsive to verifying the conformance, communicating an indication to the requesting computing device of whether the package was in conformance with the one or more package, paper, and default specification(s).

* * * * *